Aug. 14, 1951   N. E. WAHLBERG   2,564,137
HYDRAULIC BRAKE MASTER CYLINDER
Filed Feb. 12, 1945   2 Sheets-Sheet 1
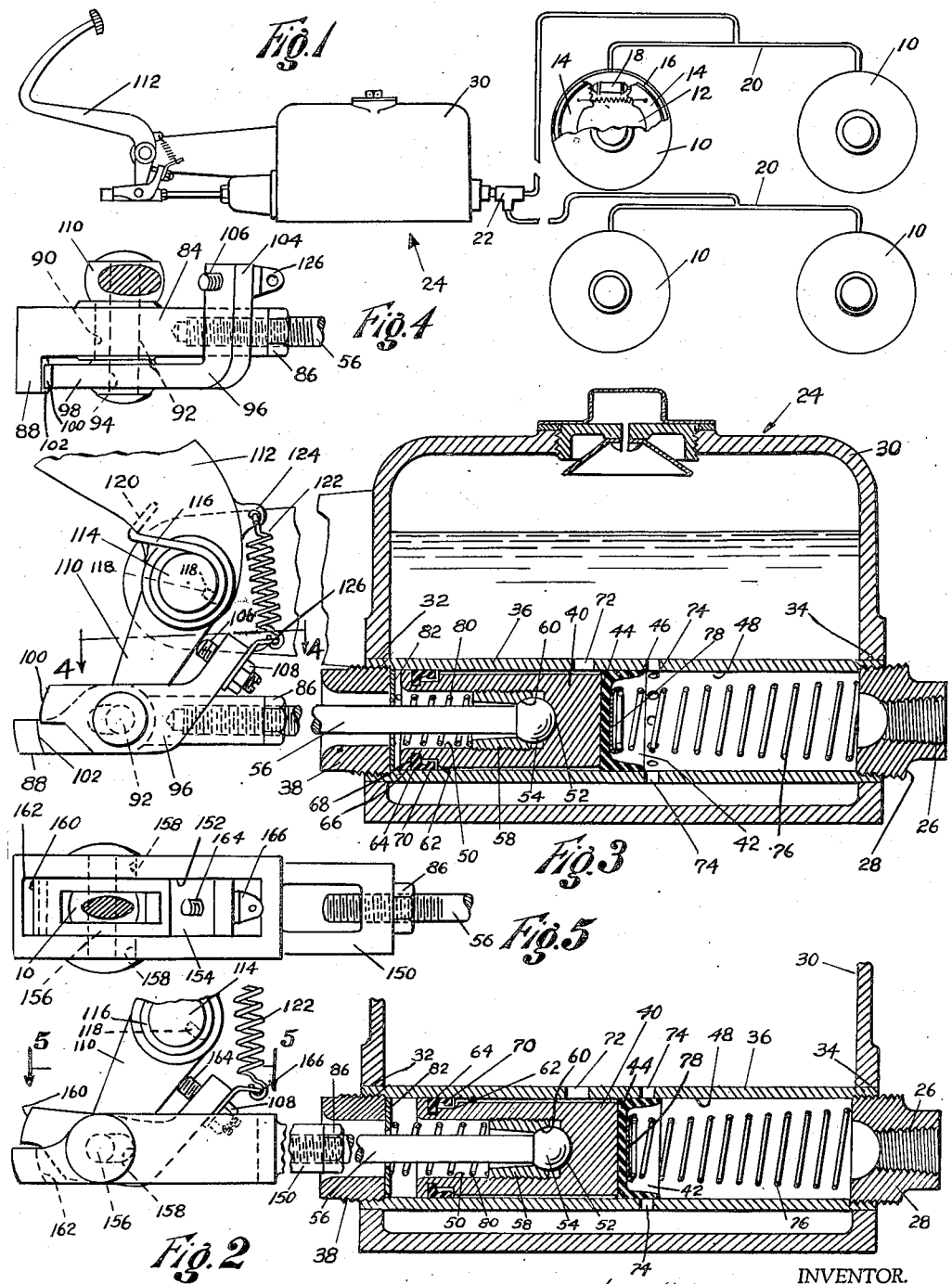
INVENTOR.
N. E. WAHLBERG
BY Carl J. Barbee
HIS ATTORNEY

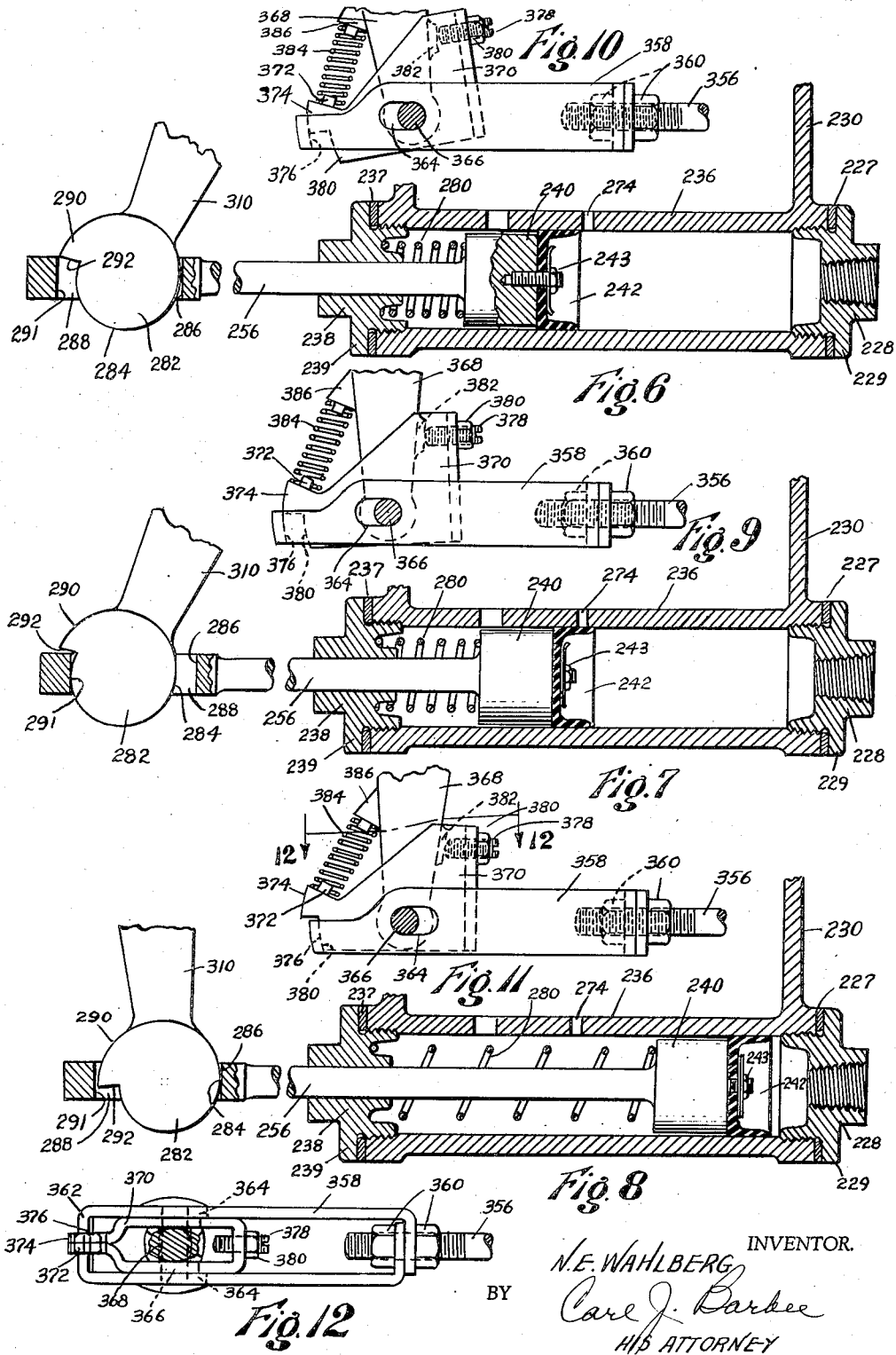

Patented Aug. 14, 1951

2,564,137

UNITED STATES PATENT OFFICE 2,564,137

HYDRAULIC BRAKE MASTER CYLINDER

Nils Erik Wahlberg, Chicago, Ill., assignor to Nash-Kelvinator Corporation, Kenosha, Wis., a corporation of Maryland Application February 12, 1945, Serial No. 577,474

18 Claims. (Cl. 60—54.6)

This invention relates to hydraulic brakes and more particularly to a master cylinder for a hydraulic braking system for automotive vehicles.

It is an object of this invention to provide a brake master cylinder which is easy to manufacture, is of relatively cheap construction and yet which will perform its assigned function efficiently and in a dependable manner.

It is a further object of the invention to provide a master cylinder which can be assembled from parts which are simple and cheaply made.

It is a further object of the invention to overcome the defect of porosity in a master cylinder, to which most master cylinder castings are subject.

It is a further object of the invention to provide a master cylinder in which the advantages of cheapness and efficiency are present, which will function to maintain pressure in the fluid lines of the system while the system is not in use and yet which will function to bleed air and vapor bubbles from the system as well as to fill the system upon each actuation of the brake pedal without the necessity for employing the usual flow retarding and pressure maintaining valves such as are common in master cylinders today.

Further objects and advantages of the invention will appear hereinafter as the description proceeds and will be pointed out more fully in connection with the appended claims.

In the drawings, of which there are two sheets:

Figure 1 is a diagrammatic side elevational view partially in section of a brake system showing the master cylinder and actuating means of the present invention;

Figure 2 is an enlarged side elevational view of the master cylinder in partial cross section in order more clearly to illustrate the same, the master cylinder piston being shown in its normal at rest position;

Figure 3 is an elevational view, partially in section, of a modification of the master cylinder and actuating mechanism shown in Figures 2 and 5 but showing the piston in its retracted position as the brake pedal nears the end of its retractile stroke;

Figure 4 is a plan view, partially in section of the actuating means shown in Figure 3 taken upon a plane as indicated by the line 4—4 of Figure 3 and looking in the direction of the arrows;

Figure 5 is a plan view, partially in section of the actuating means shown in Figure 2 taken upon a plane as indicated by the line 5—5 of Figure 2 and looking in the direction of the arrows;

Figure 6 is a view similar to Figure 3 showing a modified form of the invention;

Figure 7 is a sectional view similar to Figure 6 but showing the brake actuating means and piston in its normal at rest position and in this respect similar to Figure 2;

Figure 8 is a view similar to Figure 7 but showing the master cylinder with the piston and brake actuating means in the fully applied position;

Figure 9 is a partial side elevation of a brake actuating means illustrating a further modification of the same and showing the actuating mechanism in a position similar to that shown in Figures 3 and 6;

Figure 10 is a side elevation of the mechanism shown in Figure 9 but showing the brake in fully applied position;

Figure 11 is a side elevational view of the mechanism shown in Figures 9 and 10 but showing the actuating mechanism in the released or at rest position of the master cylinder; and Figure 12 is a horizontal sectional view of the mechanism shown in Figures 9, 10 and 11 through the brake actuated mechanism taken substantially upon a plane as indicated by the line 12—12 of Figure 11 and looking in the direction of the arrows.

Referring in detail to the drawings, in which similar reference characters are employed to designate similar parts, the system is illustrated in Figure 1 as comprising a set of brake drums 10 which may be suitably mounted upon wheels of a vehicle (not shown), the brake drums being provided with backing plates 12 supported from the vehicle and in turn supporting, by any desired means, brake shoes 14 provided with friction facing material 16. The brake shoes 14 are, in this case, of an internally expanding variety and are adapted to be urged into braking position against the interior of the drums 12 by means of motors comprising wheel cylinders 18 located between adjacent ends of the shoes 14 for spreading such ends apart and forcing the friction surfaces 16 into contact with the inside diameter of the drum 10.

The wheel cylinders 18 are actuated by means of the fluid lines 20 which are supplied with fluid under pressure through a coupling 22 from the brake master cylinder illustrated in general at 24. The coupling 22 may be provided with a male thread threadedly engaged with the female pipe thread 26 (see Figures 2 and 3) provided in a plug 28 threaded into the end of the master cylinder as will be more fully explained later.

The master cylinder proper comprises a body 30 which may be cast of iron or any other suitable material. It should be noted that the body casting 30 is of single wall thickness and therefore can be manufactured quite simply without the necessity for using multiple cores and may indeed be made from a green sand core with only a single internal core. Thus the danger of porosity is avoided by not having a core within a core in the casting process. The body casting 30 is provided with a pair of aligned apertures 32 and 34 in opposite longitudinal ends thereof. Such apertures may be cored in the casting but in any event are later drilled and reamed to size to provide perfectly aligned seats in which a seamless tube 36, which may be centerless ground to proper size, is inserted. The tube 36 may have a pressed fit with the inside diameter of the apertures 32 and 34 and is also internally broached for final finish prior to assembly with the body 30.

The final assembly of the tube 36 to the body 30 is made by threading the pipe plugs 28 and 38 into the ends of the tube 36. The threaded ends of pipe plugs 28 and 38 being tapered will expand the ends of the tube 36 into fluid-tight contact with the walls of the apertures 32 and 34. It should be noted that while the plugs 28 and 38 are described as having pipe threads, these threads are actually full threads arranged upon a taper so that there is a complete engagement of threads throughout the entire length of the surfaces in contact and are not identical with pipe threads except that the general contour is tapered.

Prior to threading the front plug 38 into its respective end of tube 36, the piston 40 and cooperating mechanism is inserted through said end into tube 36 to complete the master cylinder. The piston 40 is provided upon its rearwardly presented surface with a cup washer 42 of rubber or similar flexible elastic material, such cup washer 42 having a disc-like body portion 44 and a peripheral, upstanding, tapering flange 46 extending circumferentially thereabout and acting to seal the cup washer 42 against the inside walls 48 of the cylinder 36.

The piston 40 is provided with a blind hole 50 extending from its front surface toward its rear surface, the bottom of such hole being provided with a partially spherical depression 52 within which there is received the ball end 54 of a rod 56. The ball end 54 of rod 56 is held in place upon the partially spherical seat 52 by means of a sleeve nut 58 threadedly received within the hole 50 and having a rear surface 60 (see Figure 3) shaped to fit the forward surface of ball 54. The piston is also provided with a peripheral groove 62 within which there is received a sealing member 64 having an inwardly extending annular flange 66 seated in the innermost portion 68 of groove 62 and a rearwardly extending annular lip 70 which co-acts with the internal cylinder wall 48 to provide an atmospheric seal against the loss of fluid forwardly of the piston.

The wall of cylinder 36 is provided with a large port 72 which opens into the reservoir provided by the master cylinder body 30 for the purpose of lubricating the piston in its motion along the internal cylinder wall 48 and with a series of small ports 74 which are arranged with their axes in the same vertical transverse plane of the cylinder and slightly behind the fully retracted position of the piston cup washer lip 46 when the piston is in its fully retracted position. Ports 74 provide means for initial filling and constant replenishment of the cylinder and system and for the bleeding or elimination of air and vapor bubbles which may collect within the system.

It will be understood by those skilled in the art that piston 40 will of necessity be of a slightly smaller diameter than the inside walls 48 of cylinder 36 so that said piston may be freely reciprocable within the cylinder. Piston 40 is provided with a fluid seal 64 near its retractile side which is of a type to prevent any fluid flow in that direction. Cup washer 44 is positioned against the opposite end of piston 40 and is of such a design that fluid may by-pass cup washer 44 to the compressive side of piston 40 but not in the opposite direction. Port 72 formed in cylinder 36 is provided to lubricate piston 40 by permitting fluid from the reservoir to contact said piston. Further, said fluid will flow through port 72 and fill the space between the outer surface of piston 40 and the inner walls of cylinder 36 and will be drawn past cup washer 44 if a vacuum is created on the compressive side of piston 40. Such a vacuum will only be created when there is a loss of fluid from the system which is undesirable and abnormal. If such a loss is so small as not to be of a serious nature, the small amount of fluid which can by-pass cup washer 44 will compensate for this loss. If the loss is greater, it will be found that something is radically wrong somewhere in the brake system and provision for supplying a greater amount of fluid by-passing cup washer 44 would not remedy the defect; in this case, the whole system must be checked and the defect repaired.

The cup washer 42 may be held in place upon the rear face of the piston 40 by means of a compression cup washer spring 76 having one end seated upon the innermost face of the plug 28 and its other end seated in a retainer 78 which rests upon the exposed surface of the cup washer 42. Spring 76 constrains the cup washer to follow the piston in its movements. The piston will be urged in the retractile stroke direction by the spring 76 but this retractile force is counter-balanced by a short and somewhat heavier compression pressure-maintaining spring 80 which has one end seated upon the front end of the sleeve nut 58 and its other end seated upon a surface of a washer 82 which is held in place within the cylinder 36 by means of the plug 38. The pressure-maintaining spring 80 being stronger than the cup washer spring 76 tends to force the piston rearwardly against the retracting action of the spring 76 and normally has sufficient force to move the piston 40 rearwardly to such a position that the lip 46 of the cup washer 42 overlies the series of apertures 74 and thus produces a slight fluid pressure in the system.

The forward end of the rod 56 terminates (in the modification shown in Figures 3 and 4) in a threaded end which may be threaded into an L-shaped forging 84, a lock nut 86 being employed for holding the rod against retraction from its threaded engagement with the forging 84. The forging 84 has a front portion 88 which forms the foot of the L. The forging 84 is also provided with a slot 90 within which a pin 92 is slidable for a purpose which will be later explained.

The pin 92 is pivotally received within an aperture 94 formed in a second L-shaped forging 96 and having a forward end 98 provided with a curvature 100 concentric to the pin 92. The foot 88 of the L-shaped forging 84 has a curvature 102 mating with the curvature 100 of the release member 96. The rearward end 104 of the release member 96 extends laterally and upwardly and is tapped to receive a stud 106 which is adjustably locked in place by means of a lock nut 108. The stud 106 is adapted to abut against the underside of a pedal lever arm 110 so as to cause a release of the curved surfaces 100 and 102 from one another as the pedal 112 nears its retracted position.

The pedal 112 is mounted for rotation upon a shaft 114 extending transversely of the vehicle and is urged to its uppermost position by means of a spring 116 which is coiled around the shaft 114 having one end 118 inserted in a hole in the shaft 114 and its opposite end provided with a hook 120 exerting a force against the pedal 112 tending to rotate it in a clockwise direction as viewed in Figures 1 and 3 about the shaft 114.

Upon depression of the pedal 112 resulting in counterclockwise rotation thereof about shaft 114, the first action of the mechanism results in movement of the pin 92 to the rearward end of the slot 90 of the forging 84 to take up the lost motion. A coil spring 122 having one end anchored in a lug 124 upon the pedal lever 112 and its other end anchored upon an extension 126 from the release member 96 tends to rotate the release member 96 in a counterclockwise direction around pin 92 as viewed in Figure 3 to cause the curved surface 100 to drop down within the curved surface 102 as the pedal proceeds toward brake-applied position. While this is occurring, the slack existing between the slot 90 and pin 92 has been taken up and the piston 40 is moved from its at-rest position to compress the fluid to the rear thereof and force fluid into the system in quantities sufficient to actuate the wheel cylinders 18.

When the brake pedal 112 is released, spring 116 tends rapidly to return said pedal to its retractile position, thereby retracting the rod 56 and piston 40 and causing the cup washer 42 to follow the piston under the impetus of cup washer spring 76. In its retraction, the piston 40 is forced to return to a position shown in Figure 3 with cup washer 42 forward of the ports 74, thereby exposing them to the fluid reservoir existing within the master cylinder body 30 and permitting any air bubbles or vapor bubbles trapped within the cylinder to escape by means of the ports 74 and the place of said air or vapor bubbles to be taken by fresh fluid from the reservoir through the lower ports 74.

As the pedal 112 approaches its fully retracted position, the stud 106 upon release element 96 being in contact with the arm 110 of the brake pedal lever 112 will cause the front end 100 of the release element 96 to lift out of contact with the curved surface 102 of the L-shaped forging 84, permitting said L-shaped forging 84 and the piston rod 56 to be returned to the position shown in Figure 2 under the impetus of pressure-maintaining spring 80.

In order to fill the system at the time that it is installed, it is only necessary to open bleed valves at the wheel cylinders and to pump the brake pedal back and forth, permitting it to release at the end of each stroke as described above. This will cause rapid flow of fluid throughout the system by reason of the intake upon each stroke of quantities of fluid through the ports 74 and the exhaust of air at the bleed valves of the wheels.

The position occupied by the cup washer 42 in the normal at-rest condition of the braking system as shown in Figure 2 operates effectively to impose a spring produced pressure upon the fluid in the system. The cup washer spring 76 is not strong enough to counterbalance pressure-maintaining spring 80 but cup washer spring 76 plus the residual pressure in the system will effectively balance the pressure-maintaining spring 80 to insure an at-rest position corresponding approximately to that shown in Figure 2. The relative strengths of the springs 76 and 80 are such as to create a residual pressure within the system of approximately five to ten pounds per square inch and this pressure effectively prevents the entrance into the system of air, dirt and other foreign matter by the expansion of the cup washers both at the wheel cylinders and at the master cylinder against the cylinder walls.

Referring briefly to Figure 5, the mechanism therein illustrated is an equivalent form of release mechanism to that shown in Figures 1 to 4 and comprises a forging 150 into which the piston rod 56 may be threaded and secured by a lock nut 86. Forging 150 is provided with a rectangular slot 152 in its forward end within which a release member 154 may be received for pivotal movement upon a pin 156. Pin 156 is adapted to be rotatably supported upon the lower end 110 of the brake lever and is slidably received within slots 158 formed in opposite sides of the rectangular portion of the element 150. The front portion 160 of the release element 154 and the rearwardly directed front surface 162 of the forging 150 are designed to cooperate with one another in the same manner as the surfaces 100 and 102 of Figure 3. The release member 154 is also provided with a stud 164 similar to stud 106 of Figure 3 and a spring (not shown) may have its lower end anchored in the lug 166 similar to 126 of Figure 3 and upon the brake pedal lever for the same purpose as shown and described in connection with Figure 3.

In Figures 6, 7 and 8, a slightly different form of the invention is shown. In this instance the body or reservoir 230 is formed of a single casting together with the cylinder 236 and the ends of the cylinder are faced off to provide seats for gaskets 227 and 237. The plugs 228 and 238 closing the ends of the cylinder 236 are provided with annular flanges 229 and 239 which seat upon the gaskets 227 and 237.

In this modification, the piston 240 is shown as having the cup washer 242 attached thereto by means of a stud and lock nut 243 and the piston rod 256 is shown as being integral with the piston 240, the forward plug 238 being provided with an aperture for slidably receiving and guiding the piston rod 256 to retain it in a position for straight line motion. A pressure-maintaining spring 280 may be interposed between the plug 238 and the piston 240 for returning the piston to the final at-rest position as shown in Figure 7. This pressure-maintaining spring 280 is of sufficient strength to impose a predetermined pressure upon the fluid remaining in the system of approximately five to ten pounds per square inch when the cup washer 242 and piston 240 have moved into the position shown in Figure 7 and when such pressure has been built up, the pressure-maintaining spring 280 and pressure retain the piston 240 in a position of balance, closing off ports 274 as shown in Figure 7.

The release of the piston after it has been retracted to the position shown in Figure 6 is accomplished by the arrangement of a cam 282 upon the lower end of the brake pedal 310. The cam 282 is provided with a portion 284 of uniform diameter to operate against the rearward end 286 of a slot 288 formed in the front portion of the piston rod 256. Cam 282 is also provided with a lobe 290 having sharp cutoff portion 292 as will shortly be explained. To begin the compression stroke, the cam 282 moves from the position shown in Figure 7 first to take up the slack existing between surface 284 and surface 286. When this lost motion has been taken up, the pedal 310 functions directly through contact between surfaces 284 and 286 to urge the piston rod 256 and piston 240 rearwardly to produce pressure within the cylinder 236 for distribution through the fluid lines to the wheel cylinders.

With the brake pedal fully depressed, the piston 240 lies in the position shown in Figure 8 and it will be noted that the lobe 290 in such instance lies wholly within the slot 288 with the surface of the lobe 290 abutting against the rearwardly presented surface 291 of the slot 288. Upon release of the brake pedal, a return spring (similar to that shown in Figure 3) tends to return the pedal to its normal position and lobe 290 drives the surface 291 toward the front of the vehicle to retract the piston rod 256 and piston 240.

Upon reaching the position shown in Figure 6, the lobe 290 moves out of engagement with the surface 291, thereupon releasing the piston rod from the influence of the cam lobe 290 and permitting the compression-maintaining spring 280 to urge the piston toward the right as viewed in Figure 7 for the purpose of compressing the fluid in the system to the desired residual pressure. While the lobe 290 is retracting the piston 240 and cup washer 242 beyond the port 274, the air and vapor bubbles, if any have collected within the master cylinder, are released and replaced by fluid flowing into the master cylinder through the lower ports. Again, in this instance, pumping of fluid into the system is accomplished by moving the brake pedal back and forth and permitting it to release at the end of each stroke as explained in connection with Figures 1 to 4, inclusive.

Referring to Figures 9, 10, 11 and 12, there is illustrated a still further modification of the release mechanism to insure full retractile movement of the piston prior to the system coming to rest. In this instance, the piston rod 356 is received within an aperture in a stamping 358 and held in place by means of nuts 360 threaded upon the piston rod 356 upon opposite sides of the stamping 358. The stamping is of general box shape and has a closed forward end 362. Opposite sides of the stamping are provided with slots 364 within which a pin 366 is slidably received, pin 366 being pivotally retained within the lower end of a brake pedal 368. Also pivoted upon the pin 366 is a release stamping 370 which is roughly triangular in vertical side elevation and which is formed of stamped metal to provide a box section in vertical elevation with the forward ends of the box welded together to provide a spring seat 372 and a cam surface 374 for coaction with a cam surface 376 formed upon the outer stamping 358.

The rearmost surface of the release stamping 370 has threaded thereinto a stud 378 held in adjusted position by a lock nut 380, such stud being employed to contact an abutment 382 as shown in Figures 9, 10 and 11 upon the lower end of the lever 368 to provide for swinging the stamping 370 in a clockwise direction about the pin 366 in opposition to the force exerted by a spring 384 having its opposite ends anchored upon a land 386 formed on lever 368 and the spring seat 372 upon stamping 370. As the stamping is rotated clockwise out of its position as shown in Figure 10, cam surfaces 374 and 376 are moved out of engagement with one another, the pressure-maintaining spring urging the piston to its normal position takes effect and causes overlapping of the parts 378 and 359 upon one another as shown in Figure 11 and to the extent permitted by the surfaces 380 and 376. Surface 380 in such an instance functions as a stop element to prevent undue projection of the piston within the cylinder and as an additional safety feature to prevent the residual pressure from becoming too large. However, under normal circumstances, the rate of the spring for urging the piston rearwardly is so chosen as to diminish quite rapidly once the cup washer has passed the ports giving the master cylinder access to the reservoir and yet with adequate provision being made for maintaining a minimum residual pressure within the system.

It will thus be seen that means have been provided for building a brake master cylinder in which the brake master cylinder is so connected to a brake pedal and to the remainder of a fluid braking system that a residual pressure is maintained in the system at all times to prevent leaking of fluid out of the system and to prevent the leakage of air into the system. The system is also so constructed as to permit the escape of air and vapor bubbles from the system and to permit the filling of voids in the system caused by such bubbles upon each actuation of the brakes. It will also be noted that the system is simple to construct and readily lends itself to present day manufacturing processes.

While the invention has been described in considerable detail, such description is not to be taken as limiting the invention. All equivalents falling within the scope of the attached claims are expressly reserved.

What is claimed is:

1. In a fluid pressure system, a reservoir, fluid in said reservoir, a cylinder supported in said reservoir in a horizontal position and surrounded by said fluid, a piston in said cylinder reciprocable from a fully retracted position to a fully extended position, means for reciprocating said piston, a plurality of ports extending through the wall of said cylinder and having their principal axes located in the same vertical transverse plane of the cylinder, and spring means urging said piston to a position of rest in which said piston overlies and closes said ports, said piston-reciprocating means including a one-way releasable driving connection for retracting said piston to its fully retracted position to clear said ports, said connection being broken upon the piston reaching its fully retracted position.

2. In a fluid pressure system, a cylinder, a pedal lever, a piston within said cylinder, a piston rod connecting said piston with the pedal lever, a slot in the end of said piston rod remote from said piston, a cam on the lower end of said pedal lever having a portion operating against one face of said slot to drive said piston in a compressive direction, and a lobe on said cam which engages another face of said slot to provide a driving connection for retracting said piston to a fully retracted position at which position said connection is broken.

3. In a fluid pressure system, a pedal lever movable to and from an at-rest position, a piston, a piston rod connecting said piston with said pedal lever, a slot adjacent the end of said piston rod, a pin slidable in said slot and fast on said pedal lever, a release member pivoted on said pin, said release member constituting a part of a one-way driving connection for retracting said piston to its fully retracted position, means for latching said pedal lever and piston rod to one another at one end of the sliding motion of said pin in said slot, and means for releasing said latching means as the pedal approaches the at-rest position.

4. A fluid pressure system, a reservoir, fluid in said reservoir, a cylinder supported in said reservoir in a horizontal position and surrounded by said fluid, a piston in said cylinder reciprocable from a fully retracted position to a fully extended position, means for reciprocating said piston including a pedal lever and a piston rod, a plurality of ports extending through the wall of said cylinder and having their principal axes located in the same vertical transverse plane of the cylinder, and spring means urging said piston to a position of rest in which said piston overlies and closes said ports, said piston-reciprocating means including a one-way releasable driving connection for retracting said piston to its fully retracted position to clear said ports, said connection being broken upon the piston reaching its fully retracted position and including a pin and slot connection between the pedal lever and piston rod providing lost motion to permit spring means to urge the piston to the position of rest.

5. A fluid system, a pedal lever, a spring exerting rotating force against said pedal lever, a reservoir, fluid in said reservoir, a cylinder supported in said reservoir in a horizontal position and surrounded by said fluid, a piston in said cylinder reciprocable from a fully retracted position to a fully extended position, means for reciprocating said piston, and means providing a one-way releasable lost-motion driving connection included in said piston-reciprocating means for retracting said piston to its fully retracted position, said one-way driving means cooperating with the pedal lever to break said driving connection with the piston upon its reaching its fully retracted position.

6. In a fluid pressure system, a cylinder, a pedal lever, a piston within said cylinder, a piston rod connecting said piston with the pedal lever through a one-way releasable lost-motion driving connection for reciprocating said piston from a fully retracted to a fully extended position, said driving connection comprising a transverse slot in the end of said piston rod remote from said piston, a cam on the lower end of said pedal lever having a portion operating against one face of said transverse slot to drive said piston in a compressive stroke, a lobe on said cam which engages another face of said slot, thereby making a driving connection retracting said piston to a fully retracted position, at which position said connection is broken, a vertical slot in said piston rod adjacent the end remote from said piston, and a pin slidable in said slot and fast on said pedal lever.

7. In a fluid pressure system, a pedal lever movable to and from an at-rest position, a reservoir, fluid in said reservoir, a cylinder supported in said reservoir and surrounded by said fluid, a piston in said cylinder reciprocable from a fully retracted position to a fully extended position, a piston rod, a one-way releasable lost-motion driving means connecting said piston rod remote from said piston with said pedal lever, said driving means comprising a slot adjacent the end of said piston rod, a pin slidable in said slot and fast on said pedal lever, a driving surface on said piston rod, a release member pivoted on said pin, said release member having a driving surface arranged to cooperate with the driving surface of the piston rod, said release member being biased about its pivotal connection with said lever to urge said driving surfaces into cooperating relationship, the length of the release member from the pin to the driving surface of the release member being equal to the distance from the slot to the driving surface of the piston rod to permit the release member and piston to cooperate when the pin lies at one limit of its travel in said slot, said driving surfaces joining to make a driving connection as the movement of the pedal lever is reversed, and stop means on each of said pedal lever and said release member, said driving connection being broken by engagement of said stop means and rotation of said driving surfaces out of engagement with one another as said pedal lever returns toward fully retracted position.

8. In a fluid pressure system, a pedal lever, a reservoir, fluid in said reservoir, a cylinder supported in said reservoir and surrounded by said fluid, a piston in said cylinder reciprocable from a fully retracted position to a fully extended position, a piston rod, and means for reciprocating said piston and piston rod, said reciprocating means including a one-way releasable driving connection having a release mechanism cooperating with the movement of the pedal lever alternatively engaging said piston rod at the start of the retractile stroke and breaking said engagement when the full retractile position of the piston is reached.

9. In a fluid pressure system, a pedal lever, a spring exerting rotating force against said pedal lever, a reservoir, fluid in said reservoir, a cylinder supported in said reservoir and surrounded by said fluid, a piston in said cylinder reciprocable from a fully retracted position to a fully extended position, and means for reciprocating said piston, said reciprocating means comprising a piston rod connected at one end to said piston and connected at its other end to the pedal lever by a one-way releasable lost-motion driving connection member, said connection member comprising a pin and slot arrangement between said pedal lever and said driving connection member, and means rotatably mounted on said pin arranged to cooperate with the piston rod upon movement thereof, said means having a face designed to connect with a rearward face of said connection member, thereby forming a driving connection retracting said piston to a fully retracted position, at which position said connection is broken by the cooperation of said means with the pedal lever.

10. In a fluid pressure system, a reservoir, fluid in said reservoir, a cylinder supported in said reservoir, a piston in said cylinder reciprocal from a fully retracted position to a fully extended position, means for reciprocating said piston including a pedal lever and a piston rod and a one-way releasable lost-motion driving connection therebetween designed for retracting said piston to fully retracted position and then releasing said piston rod permitting movement of said piston in the opposite direction, and a compression spring extending between and seated on the closed retractile end of said cylinder and the retractile side of said piston urging said piston in the direction 11. In a fluid pressure system, a reservoir, fluid in said reservoir, a cylinder supported in said reservoir and surrounded by said fluid, a piston in said cylinder reciprocable from a fully retracted position to a fully extended position, a pedal lever, and a piston rod attached at one end to said piston and having a connection means for connecting said piston rod to said pedal lever at its other end, said connection means comprising a member with a vertical slot to receive said pedal lever and a transverse slot to slidably receive a pin fast to said pedal lever.

12. In a fluid pressure system, a reservoir, fluid in said reservoir, a piston supported in said reservoir and surrounded by said fluid, said piston reciprocable from a fully retracted position to a fully extended position, a piston rod secured to said piston, a rotatable lever, a releasable lost-motion connection between the end of said piston rod and said lever comprising a transverse slot in said end of the piston rod, a driving surface on the rod adjacent the said end of the rod, a pin carried adjacent the end of said lever within said slot, and rotatable means carried on said pin engaging the driving surface of the rod at the beginning of the movement from the fully extended position of the piston and disengaging said surface at the fully retracted position of said piston.

13. In a fluid pressure system, a reservoir, fluid in said reservoir, a cylinder in said reservoir, a plurality of ports extending from said reservoir through the walls of said cylinder, a piston in said cylinder reciprocable from a fully retracted to a fully extended position, a compression spring in said cylinder abutting the forward side of said piston, a piston rod secured to said piston and extending outside said cylinder, a rotatable lever, a lost-motion connection between said lever and the outer end of the piston rod comprising a transverse slot in the said end of the rod, a pin carried within said slot by the lever, a driving surface defined by the end of said rod, a driving means rotatable by the lever and carried by said pin, and a driving surface on said driving means engaging said driving surface of the rod as the rod is retracted and disengaging said surface at the fully retracted position.

14. In a fluid pressure system, a reservoir, fluid in said reservoir, a pedal lever, a cylinder in said reservoir, a piston in said cylinder, a rod connecting said piston to said lever, a slot in the end of said rod remote from said piston, a cam on the end of the lever adjacent said rod having a portion engaging one face of said slot to drive said piston in one direction, and a lobe on said cam which engages an opposite face of said slot to drive said piston in a retractile direction to a position where said lobe disengages said face.

15. In a fluid pressure system, a reservoir, fluid in said reservoir, a pedal lever, a cylinder in said reservoir, a piston in said cylinder reciprocable from a fully retracted to a fully extended position, a rod secured to said piston, connection means between the end of said rod remote from said piston and the lower end of said lever comprising a slot in said end of the rod, a pin carried by said lower end of said lever having a portion movable within said slot, means rotatable by said lever on said pin, a first cam surface on said end of the rod, and a second cam surface on said means which alternately engages and disengages said first cam surface.

16. In a fluid pressure system, a reservoir, fluid in said reservoir, a cylinder in said reservoir, a piston reciprocable from a fully retracted to a fully extended position within said cylinder, a rod secured to said piston, a pedal lever, connection means joining said lever to the end of said rod remote from said piston comprising a slot in said end of said rod, a pin slidable within said slot carried by said lever, a first cam surface on said rod, and means rotatable by said lever and having a cam surface alternately engaging and disengaging said first cam surface as said piston is reciprocated from the fully extended position to the fully retracted position.

17. In a fluid pressure system, a reservoir, fluid in said reservoir, a cylinder in said reservoir in a horizontal position, a piston in said cylinder reciprocable from a fully retracted to a fully extended position, means for reciprocating said piston, a port communicating said reservoir with said cylinder, and means urging said piston to a position of rest in which said piston closes said port, said piston-reciprocating means including a one-way releasable driving connection for retracting said piston to its fully retracted position to clear said port, said connection being broken upon the piston reaching its fully retracted position.

18. In a fluid pressure system, a motion transmitting means comprising a fluid reservoir, a cylinder in said reservoir, a piston in said cylinder reciprocable from a fully retracted to a fully extended position, a port communicating said reservoir with said cylinder, means urging said piston to a position of rest in which said piston closes said port, and means for reciprocating said piston including a one-way releasable driving connection for retracting said piston to clear said port, said connection being broken after said piston has cleared said port.

NILS ERIK WAHLBERG.

REFERENCES CITED

The following references are of record in the file of this patent:

UNITED STATES PATENTS

| Number | Name | Date |
|---|---|---|
| 1,696,721 | Mattingly | Dec. 25, 1928 |
| 1,851,226 | White | Mar. 29, 1932 |
| 1,997,100 | Boughton | Apr. 9, 1935 |
| 2,054,862 | Oliver | Sept. 22, 1936 |
| 2,076,363 | Brunner | Apr. 6, 1937 |
| 2,160,075 | La Brie | May 30, 1939 |
| 2,232,350 | Swift | Feb. 18, 1941 |
| 2,340,466 | Gosling | Feb. 1, 1944 |